(12) United States Patent
Chkodrov et al.

(10) Patent No.: US 8,315,972 B2
(45) Date of Patent: *Nov. 20, 2012

(54) METHOD FOR MAINTAINING DATABASES INFORMATION ABOUT MULTIPLE INSTANCES OF AN ACTIVITY GENERATING, UPDATING VIRTUAL OLAP CUBE BASED ON MODIFIED STAR-SCHEMA

(75) Inventors: Gueorgui Bonov Chkodrov, Redmond, WA (US); Richard Zachary Jason, Seattle, WA (US); Eric Anthony Reel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 678 days.

This patent is subject to a terminal disclaimer.

(21) Appl. No.: 10/670,276

(22) Filed: Sep. 26, 2003

(65) Prior Publication Data

US 2005/0071341 A1    Mar. 31, 2005

(51) Int. Cl.
G06F 17/00    (2006.01)
(52) U.S. Cl. .................... 707/607; 707/600; 707/605
(58) Field of Classification Search .................. 707/1–7, 707/100–104.1, 200, 600, 605, 607; 706/45–51; 709/209–215; 715/968
See application file for complete search history.

(56) References Cited

U.S. PATENT DOCUMENTS

| 5,319,780 | A |   | 6/1994  | Catino et al. |
| 5,537,589 | A |   | 7/1996  | Dalal |
| 5,713,020 | A |   | 1/1998  | Reiter et al. |
| 5,781,896 | A |   | 7/1998  | Dalal |
| 5,819,293 | A | * | 10/1998 | Comer et al. .................. 707/203 |
| 5,822,751 | A |   | 10/1998 | Gray et al. |
| 5,852,818 | A | * | 12/1998 | Guay et al. ........................ 707/1 |
| 5,905,985 | A |   | 5/1999  | Malloy et al. |
| 5,926,818 | A |   | 7/1999  | Malloy |
| 5,940,818 | A |   | 8/1999  | Malloy et al. |
| 5,943,668 | A |   | 8/1999  | Malloy et al. |
| 5,978,796 | A |   | 11/1999 | Malloy et al. |

(Continued)

FOREIGN PATENT DOCUMENTS

JP            64-21554        1/1989

(Continued)

OTHER PUBLICATIONS

Jana Lewerenz et al/. "Modelling data warehouses and OLAP applications by means of dialogue objects", Internatinal conference on conceptual modeling/the entitty relationship approach, 1999 15 pages.*

(Continued)

*Primary Examiner* — Srirama Channavajjala
(74) *Attorney, Agent, or Firm* — Workman Nydegger

(57) ABSTRACT

Challenges associated with maintaining information about multiple instances of an activity are addressed. Separate database tables are maintained for data corresponding to active instances of an organization's activities and for data corresponding to inactive instances of an organization's activities. Multiple database tables can be maintained for data corresponding to inactive instances of an activity. In another aspect, data from the active instances table and one or more inactive instances tables are processed to generate combined analysis data.

46 Claims, 7 Drawing Sheets

U.S. PATENT DOCUMENTS

| | | | |
|---|---|---|---|
| 6,064,999 A | 5/2000 | Dalal | |
| 6,070,165 A * | 5/2000 | Whitmore | 707/101 |
| 6,122,636 A | 9/2000 | Malloy et al. | |
| 6,205,447 B1 | 3/2001 | Malloy | |
| 6,374,263 B1 | 4/2002 | Bunger et al. | |
| 6,430,565 B1 | 8/2002 | Berger et al. | |
| 6,438,537 B1 | 8/2002 | Netz et al. | |
| 6,442,560 B1 | 8/2002 | Berger et al. | |
| 6,477,525 B1 * | 11/2002 | Bello et al. | 707/3 |
| 6,502,086 B2 | 12/2002 | Pratt | |
| 6,516,322 B1 | 2/2003 | Meredith | |
| 6,519,601 B1 * | 2/2003 | Bosch | 707/100 |
| 6,542,895 B1 | 4/2003 | DeKimpe et al. | |
| 6,546,395 B1 | 4/2003 | DeKimpe et al. | |
| 6,581,054 B1 * | 6/2003 | Bogrett | 707/4 |
| 6,594,653 B2 | 7/2003 | Colby et al. | |
| 6,598,079 B1 | 7/2003 | Pal et al. | |
| 6,601,062 B1 * | 7/2003 | Deshpande et al. | 707/3 |
| 6,603,839 B1 | 8/2003 | Smith, Jr. et al. | |
| 6,609,123 B1 * | 8/2003 | Cazemier et al. | 707/4 |
| 6,643,696 B2 * | 11/2003 | Davis et al. | 709/224 |
| 6,725,287 B1 * | 4/2004 | Loeb et al. | 710/8 |
| 6,801,915 B1 * | 10/2004 | Mack | 707/100 |
| 7,069,514 B2 * | 6/2006 | DeMesa et al. | 715/744 |
| 2002/0035593 A1 * | 3/2002 | Salim et al. | 709/202 |
| 2002/0138316 A1 * | 9/2002 | Katz et al. | 705/7 |
| 2002/0178077 A1 * | 11/2002 | Katz et al. | 705/26 |
| 2002/0184225 A1 * | 12/2002 | Ghukasyan | 707/100 |
| 2003/0009705 A1 * | 1/2003 | Thelander et al. | 713/340 |
| 2003/0055677 A1 * | 3/2003 | Brown et al. | 705/1 |
| 2003/0061506 A1 * | 3/2003 | Cooper et al. | 713/201 |
| 2003/0187830 A1 * | 10/2003 | Chang et al. | 707/2 |
| 2003/0195898 A1 * | 10/2003 | Agarwal et al. | 707/103 R |
| 2003/0204281 A1 * | 10/2003 | Su et al. | 700/108 |
| 2003/0208468 A1 * | 11/2003 | McNab et al. | 707/1 |
| 2003/0217075 A1 * | 11/2003 | Nakano et al. | 707/104.1 |
| 2003/0220951 A1 * | 11/2003 | Muthulingam et al. | 707/205 |
| 2003/0225769 A1 * | 12/2003 | Chkodrov et al. | 707/100 |
| 2003/0225820 A1 * | 12/2003 | Chkodrov et al. | 709/201 |
| 2004/0064443 A1 * | 4/2004 | Taniguchi et al. | 707/3 |
| 2004/0117379 A1 * | 6/2004 | Khatchatrian et al. | 707/100 |
| 2004/0122844 A1 * | 6/2004 | Malloy et al. | 707/102 |
| 2004/0139061 A1 * | 7/2004 | Colossi et al. | 707/3 |
| 2005/0071320 A1 * | 3/2005 | Chkodrov et al. | 707/3 |
| 2005/0144185 A1 * | 6/2005 | Chkodrov et al. | 707/101 |
| 2005/0144191 A1 * | 6/2005 | Chkodrov et al. | 707/102 |
| 2005/0144192 A1 * | 6/2005 | Chkodrov et al. | 707/102 |
| 2005/0149475 A1 * | 7/2005 | Chkodrov et al. | 707/1 |
| 2005/0182784 A1 * | 8/2005 | Trappen et al. | 707/102 |
| 2011/0029478 A1 * | 2/2011 | Broeker | 707/600 |
| 2011/0055149 A1 * | 3/2011 | Pimpale et al. | 707/602 |

FOREIGN PATENT DOCUMENTS

| | | | |
|---|---|---|---|
| JP | 2001-125811 | | 5/2001 |
| JP | 2001-184239 | | 7/2001 |
| JP | 2002-157156 | | 5/2002 |
| JP | 2003-162435 | | 6/2003 |
| WO | WO 01/11497 | * | 2/2001 |
| WO | WO 03/098465 | * | 11/2003 |
| WO | WO 2004/063942 | * | 7/2004 |
| WO | WO 2005/104736 | * | 11/2005 |

OTHER PUBLICATIONS

Andrew Witkowski et al. "spreadsheets in RDBMS for OLAP", proceedings of the 2003 ACM SIGMOD international conference on management of data, 2003, pp. 52-63.*
Laks VS Lakshmanan et al. "QC-Trees: An efficient summary structure for semantic OLAP", proceedings of the 2003 ACM SIGMOD international conference on management of data, 2003, pp. 64-75.*
Elaheh Pourabbas et al. "joint queries estimation from multiple OLAP databases", IEEE proceedings of the 14th internatinal conference on scientific and statistical database management, 2002, one page.*
A. Mostefaoui et al. "Brief announcement: towards a formal model for view maintenance in data warehouses", PODC'02,ACM one page.*
Dimitri Theodoratos et al. "answring multidimentional queries on cubes using other cubes", IEEE 2000.*
J. Albrecht, A. Bauer et al. "Management of Multidimensional Aggregates for Efficient Online Analytical Processing",This paper appears in:Database Engineering and Applications, 1999. IDEAS '99. International Symposium Proceeding sAug. 1999 pp. 156-164.*
Kazutomo Ushijima et al. "SUPRA: A Sampling-query Optimization Method for Large-scale OLAP",This paper appears in: Database and Expert Systems Applications, 1998. Proceedings. Ninth International Workshop on Aug. 25-28, 1998pp. 232-237.*
Stefano Ceri et al., "Deriving Production Rules for Incremental View Maintenance," *Proc. Of 1991 VLDB Conference*, pp. 577-589, 1991.
D. Gavalas et al., "Enabling Mobile Agent Technology for Intelligent Bulk Management Data Filtering," *IEEE*, 2000 pp. 623-636, 2000.
D.L. Giles, "Usage Measurement in Support of Billing for Connectionless Data Services," *Bell Communications Research, Inc.*, 17.4-1-174-10, 1990.
G.M.E. Lafue, "Integrating language and database for CAD applications," *Computer Aided Design*, vol. 11, No. 3, pp. 127-130, May 1979.
James F. Leary et al., "Real-Time Decision-Making for High-Throughput-Screening Applications," Optical Diagnostics of Living Cells IV *Proceedings of SPIE*, vol. 4260, pp. 219-225 (2001).
Wolfgang Lehner, "Improving Query Response Time in Scientific Databases Using Data Aggregation—A Case Study," *Proc. Of 7th Int'l Workshop on Database and Expert Systems Applns.*, IEEE, pp. 201-206 (1996).
Shira Levine, "In the Black," *America's Network*, p. 18, May 15, 2002.
David B. Lomet, "Subsystems of Processes with Deadlock Avoidance," *IEEE Transactions on Software Engineering*, vol. SE-6, No. 3, May 1980.
Mukesh Muhania, "Making aggregate views self-maintainable," *Data & Knowledge Engineering*, 32 pp. 87-109, 2000.
Kevin Reardon, "The Role of Data Archives in Synoptic Solar Physics," *Synoptic Solar Physics Conference*, ASP Conference Series, vol. 140, pp. 467-474, 1998.
Cyrus Shahabi et al., "An Adaptive Recommendation System without Explicit Acquisition of User Relevance Feedback," *Distributed and Parallel Databases*, 14, 173-192 (2003).
Abraham Silberschatz et al., "A Family of Locking Protocols for Database Systems that Are Modeled by Directed Graphs," *IEEE Transactions on Software Engineering*, vol. SE-8, No. 6, pp. 558-562, Nov. 1982.

* cited by examiner

| PO# | RecvTime | City | Quantity | ShipTime | DeliveryTime |
|---|---|---|---|---|---|
| 123 | 8:00am | Seattle | 150 | 8:24am | 12:45pm |
| 124 | 8:30am | Seattle | 234 | 8:45am | 1:20pm |
| 125 | 8:35am | Redmond | 87 | 9:05am | 2:30pm |
| 126 | 8:45am | Seattle | 450 | 9:20am | 3:10pm |
| 127 | 8:55am | Redmond | 200 | 9:30am | <NULL> |
| 128 | 8:57am | Seattle | 340 | 9:20am | 3:05pm |
| 129 | 9:12am | Seattle | 120 | 9:45am | <NULL> |
| 130 | 9:30am | Redmond | 25 | 10:15am | <NULL> |
| 131 | 9:45 | Seattle | 250 | 10:35am | <NULL> |
| 132 | 10:00am | Redmond | 100 | <NULL> | <NULL> |
| 133 | 10:15am | Seattle | 230 | <NULL> | <NULL> |
| 134 | 10:25am | Redmond | 45 | <NULL> | <NULL> |
| ... | | | | | |

| PONum | RecvTime | City | Quantity | ShipTime | DeliveryTime | IsCompleted |
|---|---|---|---|---|---|---|
| ... | ... | ... | ... | ... | ... | ... |
| 8677 | 08/25/2003 1545 | Seattle | 200 | 08/25/2003 1700 | <NULL> | 0 |
| 8678 | 08/25/2003 1556 | Redmond | 300 | 08/25/2003 1710 | <NULL> | 0 |
| 8679 | 08/25/2003 1422 | Redmond | 140 | 08/26/2003 0845 | <NULL> | 0 |
| 8680 | 08/25/2003 1719 | Redmond | 270 | <NULL> | <NULL> | 0 |
| 8681 | 08/26/2003 0755 | Seattle | 185 | 08/26/2003 0910 | <NULL> | 0 |
| 8682 | 08/26/2003 0812 | Redmond | 50 | 08/26/2003 0845 | <NULL> | 0 |
| 8683 | 08/26/2003 0823 | Redmond | 120 | 08/26/2003 0845 | <NULL> | 0 |
| 8684 | 08/26/2003 0841 | Seattle | 75 | 08/26/2003 1030 | <NULL> | 0 |
| 8685 | 08/26/2003 0916 | Redmond | 440 | <NULL> | <NULL> | 0 |
| 8686 | 08/26/2003 0932 | Seattle | 300 | <NULL> | <NULL> | 0 |
| 8687 | 08/26/2003 1001 | Redmond | 300 | <NULL> | <NULL> | 0 |
| ... | ... | ... | ... | ... | ... | ... |

FIG. 5

| PONum | RecvTime | City | Quantity | ShipTime | DeliveryTime | RecordID |
|---|---|---|---|---|---|---|
| ... | ... | ... | ... | ... | ... | ... |
| 7822 | 08/05/2003 0905 | Redmond | 100 | 08/05/2003 1100 | 08/05/2003 1330 | 7719465084 |
| 7823 | 08/05/2003 0935 | Redmond | 200 | 08/05/2003 1100 | 08/05/2003 1402 | 7719465085 |
| 7844 | 08/05/2003 1123 | Seattle | 220 | 08/05/2003 1315 | 08/05/2003 1551 | 7719465086 |
| 7835 | 08/05/2003 1014 | Seattle | 70 | 08/05/2003 1315 | 08/05/2003 1430 | 7719465087 |
| 7845 | 08/05/2003 1132 | Seattle | 40 | 08/05/2003 1315 | 08/05/2003 1615 | 7719465088 |
| 7847 | 08/05/2003 1145 | Redmond | 310 | 08/05/2003 1422 | 08/05/2003 1710 | 7719465089 |
| 7829 | 08/05/2003 0944 | Seattle | 250 | 08/06/2003 0845 | 08/06/2003 1120 | 7719465090 |
| 7870 | 08/05/2003 1610 | Redmond | 200 | 08/06/2003 0930 | 08/06/2003 1030 | 7719465091 |
| 7871 | 08/05/2003 1615 | Redmond | 10 | 08/06/2003 0930 | 08/06/2003 1054 | 7719465092 |
| 7879 | 08/05/2003 1704 | Seattle | 280 | 08/06/2003 0915 | 08/06/2003 1200 | 7719465093 |
| 7891 | 08/06/2003 0755 | Seattle | 275 | 08/06/2003 0845 | 08/06/2003 1000 | 7719465094 |
| ... | ... | ... | ... | ... | ... | ... |

METHOD FOR MAINTAINING DATABASES INFORMATION ABOUT MULTIPLE INSTANCES OF AN ACTIVITY GENERATING, UPDATING VIRTUAL OLAP CUBE BASED ON MODIFIED STAR-SCHEMA

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to methods and computer systems for monitoring a workflow of a business or other organization. More particularly, the present invention relates to methods for viewing information about multiple instances of an activity and for maintaining that information.

BACKGROUND OF THE INVENTION

Computers, and in particular, computer database applications, are used by businesses and other organizations to monitor and record information about an organization's activities. Often, the organization will have various processes or activities that must be performed, and which recur frequently. Indeed, it is common for an organization to have numerous instances of an activity in various stages of completion at any given time. As one example, a business may sell goods based on orders received from customers. An activity of interest may be fulfilling those customer orders; each purchase order represents a separate instance of that activity. At any particular time, that business may have multiple instances of the activity (i.e., multiple orders from multiple customers) in various stages of completion. As but another example, a financial institution may loan funds to customers based on applications from those customers. An activity of interest may be the processing of a loan application to completion (i.e., approval or rejection), with each application representing a separate instance of the activity. At any particular time, there may be multiple loan application instances in various stages of processing. As yet another example, a governmental entity responsible for issuing permits may have multiple permit applications in various stages of being processed.

In order to monitor numerous instances of an activity, many organizations store information about those activity instances in a database program. In particular, a record or other data object can be created for each instance of the activity. A separate field or other component of the record is then established to hold a value for some type of information common to each instance. Using one of the previous examples as an illustration, a business selling goods may create a separate database record for each customer order. Within that record may be separate fields for the time the order was received, where the order was received, what was ordered, when the order was shipped, etc. Such use of a database program is often conceptualized as a table. Each instance of the activity is assigned a separate row (or tuple) of the table. Each type of information common to multiple instances is then assigned a separate column of the table.

By placing data for each instance of an activity in a database table, it is then possible to analyze the data in various ways. As more and more records accumulate, however, the usefulness of a database can decrease. For a large business such as a goods seller receiving hundreds or thousands of orders per day, the number of records can reach into hundreds of thousands or millions. Each time the database is queried, a finite amount of time is needed to search a disk drive or other storage device. Similarly, as new records are created and existing records updated, a finite amount of time is needed to create or update each of those records. As the number of records grows, the time needed to find a particular record increases. In a business or organization having hundreds (or thousands) of users and hundreds of thousands (or millions) of database records, the latency for database system access can become quite substantial and the system disk(s) may become full.

FIGS. 1-3 provide a more detailed illustration of this problem, and also provide an example to build upon in the subsequent Detailed Description of the Preferred Embodiments. FIG. 1 is a flow chart showing processing of customer purchase orders by a hypothetical wholesale business which sells goods to customers based on customer purchase orders. For convenience, the business will be referred to herein as "Business A." At block 1, Business A receives a purchase order and creates a database record for the purchase order; the time of order receipt is also entered. At blocks 2 and 3, additional data is input for record fields corresponding to quantity of product ordered and the purchaser's city. At block 4 a decision is made regarding whether the purchase order will be accepted. If not, an appropriate field of the record is populated at block 5 and the time of denial recorded. If the purchase order is approved, the approval is noted. If the purchase order is approved, additional information may be entered (blocks 6 and 7). When the order is shipped (block 8), another field is populated with the time of shipment. Further data may be input at blocks 9 and 10 (e.g., the type of shipping container and the carrier). When the order is delivered, the time of delivery is input (block 11)

FIG. 2 is a table representing a portion of the database for purchase order instances of Business A. Each order is on a separate row, and each column corresponds to a type of data for an order. For simplicity, FIG. 2 only shows columns for some of the information collected in the flow chart of FIG. 1. Certain fields contain NULL values, indicating (in this example) that the value for a particular event is unknown because it has not yet transpired as to that particular purchase order. A typical query of this database might be "which purchase orders above $1000, and that were submitted last week, have not yet been approved or denied?" Such a query could be implemented via a SQL (structured query language) query on the table. Appendix A shows an implementation of SQL code to create the table of FIG. 2 ("create table PO_InstanceData") and a stored procedure to update the rows of the table in FIG. 2 ("create procedure PO_PrimaryImport"). This stored procedure accepts a PONum argument that uniquely identifies a record corresponding to one activity instance (in this example, a particular purchase order), and one parameter for each column in the table. Multiple arguments of the stored procedure allow the name-value pairs for the call to be accumulated in memory (based on the transactional logic of the application program collecting the data) before attempting to update or insert a record. Because of the processing overhead required for locking and accessing a database record, it is more efficient to update (or insert) in one command as much of a record as possible. The stored procedure first tries to override the non-null columns of the record by issuing an "update" statement, assuming that some data for a PO exists in the table. Here the function "coalesce" is used, which returns the first non-null argument. If no records were updated (@@rowcount=0), this is the first piece of information related to this purchase order, and a record is inserted with the value of all the arguments (even if they are null).

A stored procedure such as in Appendix A is satisfactory when relatively few users or programming threads are attempting to write to a table and when there are relatively few records. Unfortunately, and as shown in FIG. 3, performance degrades over time as the number of records in a table grows. The solid line represents write performance, or the number of records that can be written per second, and rapidly drops to a low level. Conversely, the average Queue Length for disk I/O (dashed line) soon increases beyond acceptable limits. This performance degradation results from the increase in table size. When the number of records is relatively small, performance is initially limited by the speed with which the database server can perform transactions, which is in turn dependent upon the capacity of the server's central processing unit(s). As the number of records increases over time (e.g., as more and more purchase orders are received and processed), performance drops drastically. For example, a first execution of the update statement in the stored procedure of Appendix A would cause a portion of the table (FIG. 2) to be read from a disk (or other non-volatile memory source) into RAM (or other memory system). As long as the total number of records is small, the server is able to cache most or all of the required data in system memory. If a subsequent update requires access to a record already cached in system memory, the server is not required to read the disk again. When the number of the records exceeds memory capacity, however, each operation can require a physical read of the disk. Depending on the hardware used, other queries against (or updates of) the table may be prevented while the disk is being read. Ultimately, this causes unacceptably slow response times for all users. The problem can be exacerbated when more complex manipulation of data in the table must be performed, such as On-Line Analytical Processing (OLAP) and creation of OLAP cubes.

SUMMARY OF THE INVENTION

The present invention addresses the above and other challenges associated with maintaining information about multiple instances of an activity. In one aspect of the invention, separate database tables are maintained for data corresponding to active instances of an organization's activities and for data corresponding to inactive instances of an organization's activities. In another aspect, multiple database tables can be maintained for data corresponding to inactive instances of an activity. In still another aspect, data from the active instances table and one or more inactive instances tables are processed to generate combined analysis data.

In one embodiment, the invention includes a method for maintaining information regarding multiple instances of an activity. Each instance of the activity has an active condition in which information about the instance is modified or an inactive condition in which information about the instance is not modified. The method includes creating a record in a first database table for each of the multiple instances that are in the active condition; each record contains a field for each of a plurality of data types, one or more of the fields in each active instance record having a value indicative of the active condition. The method further includes assigning, for each record of the multiple instances in the inactive condition, values to the one or more fields indicative of the inactive condition. The method also includes deleting from the first table records of the multiple instances having values in the one or more fields indicative of the inactive condition, as well as creating, for each of the records deleted from the first table, a corresponding record in a second database table.

In another embodiment, the method includes creating third and subsequent database tables, as well as ceasing, upon creation of a subsequent table, creation of records in the previously-created table. For each of the records deleted from the first table after creation of the last-created table but before creation of another subsequent table, a corresponding record is created in the last-created table. In still another embodiment, the method includes generating a first Online Analytical Processing (OLAP) cube for records in the first table, generating a second OLAP cube for records in the second table, and combining the first and second cubes into a virtual OLAP cube.

These and other features and advantages of the present invention will be readily apparent and fully understood from the following detailed description of preferred embodiments, taken in connection with the appended drawings.

BRIEF DESCRIPTION OF THE DRAWINGS

FIG. 5 is an example, according to at least one embodiment of the invention, of a portion of a database table containing records for activities that are still in progress.

DETAILED DESCRIPTION OF THE PREFERRED EMBODIMENTS

The present invention can be advantageously used in combination with the methods, apparatus and systems described in U.S. patent application Ser. No. 10/157,968, pub, No. US 2003/0225769 A1 titled "Support for Real-Time Queries Concerning Current State, Data and History of a Process" and filed on May 31, 2002, the contents of which are incorporated by reference herein.

The present invention will be described by reference to Structured Query Language (SQL) instructions and other data analysis features found in the SQL SERVER™ 2000 relational database management system (RDBMS) software and associated Online Analytical Processing (OLAP) services software available from Microsoft Corporation of Redmond, Wash. Although some aspects of SQL instructions that may be used to implement certain embodiments of the invention are described herein, other instructions, programming algorithms and procedures used to implement the invention will be apparent to persons skilled in the art once those persons are provided with the description provided herein. General descriptions of SQL SERVER™ 2000 RDBMS software and associated OLAP services software can be obtained from various sources, including Inside Microsoft® SQL SERVER™ 2000 by Karen Delaney (2001 Microsoft Press) and Microsoft® SQL SERVER™ 2000 Books Online, available at <http://www.microsoft.com/sql/techinfo/productdoc/2000/>. The invention is not limited to implementation using SQL SERVER™ 2000 RDBMS software and associated OLAP services software, and may be implemented using other types of RDBMS and OLAP software.

The present invention will also be described by reference to RDBMS software (such as the aforementioned SQL SERVER™ 2000 software) operating on a server and accessed by one or more clients. Such configurations are known in the art and described in, e.g., the previously-incorporated U.S. patent application Ser. No. 10/157,968 (Publication No. US-2003-0225769-A1, Publication Date: Dec. 4, 2003). However, a client-server configuration is only one example of a manner in which the invention can be implemented. The invention can also be implemented in other physical system configurations.

Figure 1:
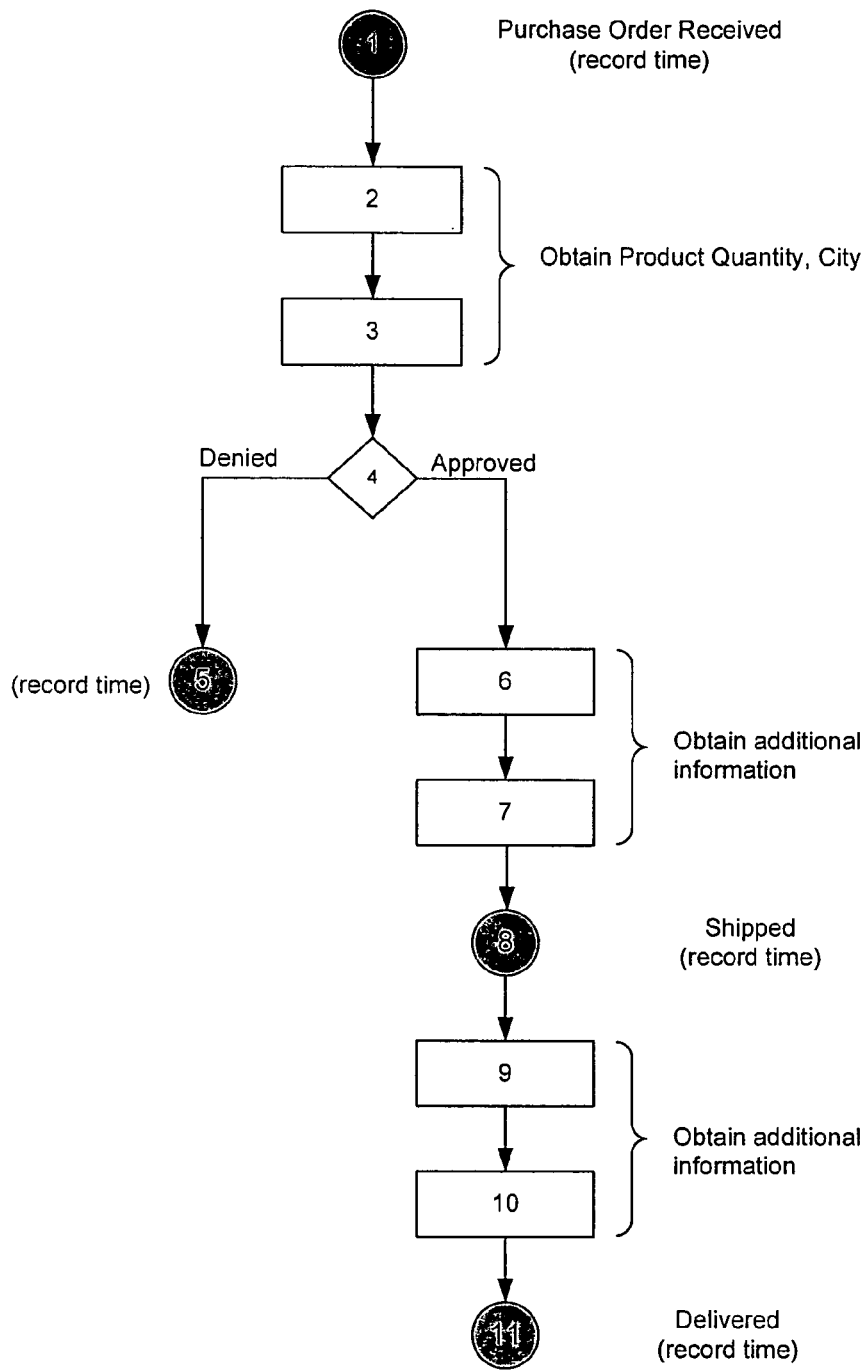
FIG. 1 is a flow chart showing processing of customer purchase orders by a hypothetical business in accordance with the prior art.

The present invention addresses many of the problems discussed above by maintaining separate tables for data corresponding to active instances of an organization's activities, as well as for a limited number of inactive instances. In many organizations, for example, the most important activities are those which are currently pending or which were recently completed. Building upon the example of hypothetical Business A discussed in connection with FIGS. 1-3, managers of Business A are most interested in purchase orders that are still being processed, i.e., for which goods have not yet been delivered. Those managers are also interested in purchase orders that were completed within a relatively recent period (i.e., the ordered goods delivered were delivered within the last several months). Although Business A is a hypothetical example created for purposes of describing the invention, it is common for actual businesses to be concerned with instances that are still in process or recently completed. In many businesses, for example, most complaints about delivered goods and most problems with payment collection occur within a short period after delivery. Although data for orders filled in earlier periods may be needed for some purposes, those needs are relatively infrequent. Similarly, many other types of businesses and organizations are most concerned with instances of an activity that are not yet completed, as well as a limited number of recently completed instances of the activity.

Figures 2, 3:
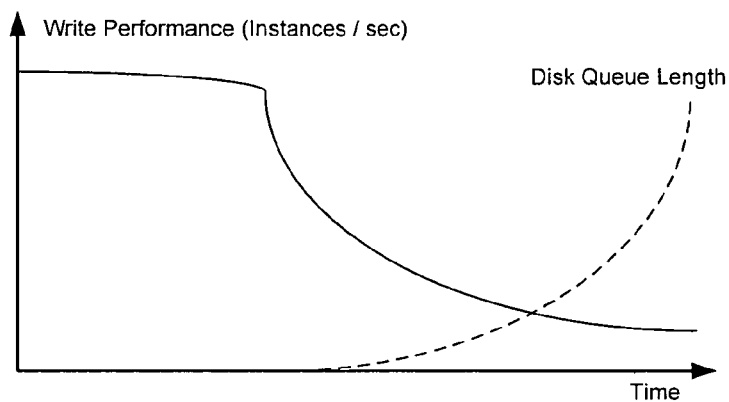
FIG. 2 is a table representing a portion of a database for a hypothetical business in accordance with the prior art.
FIG. 3 is a graph showing degradation in database system performance over time in accordance with the prior art.
Figure 4:
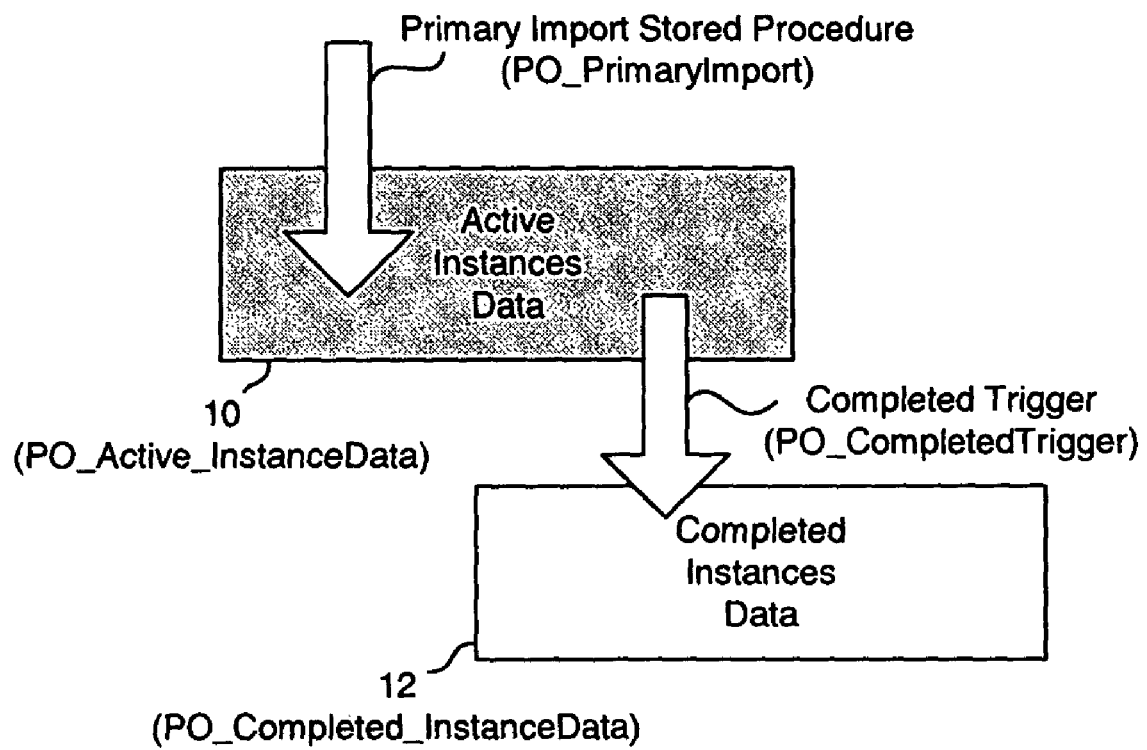
FIG. 4 is a block diagram showing separate tables for active and completed instances data according to at least one embodiment of the invention.

Accordingly, Business A maintains data for active and recently completed orders in separate database tables. By limiting those tables' contents to active and recently-completed orders, the amount of data is kept relatively small. In this manner, system performance when updating or otherwise accessing a table for active instance data does not degrade as shown in FIG. 3, and performance for accessing a completed instance table does not degrade, as records in this table are only inserted and not updated. Unlike the example of FIG. 3, overall performance remains steady over time. FIG. 4 is a block diagram illustrating this concept. Table 10 holds records for data pertaining to active purchase orders. In the example, a purchase order is active if goods ordered by a purchase order have not yet been delivered to a customer. Active instances of an organizational activity could be defined differently in other contexts. Once a purchase order is completed, data for that purchase order is moved to table 12. In the example, a purchase order is completed when ordered goods are delivered to a customer. As with active instances, completed instances of an organizational activity could be defined differently in other contexts.

As a new purchase order is received, a record is created in table 10. Table 10 is shown in block form in FIG. 4, and FIG. 5 shows a portion of table 10 in more detail. Similar to the table of FIG. 2, table 10 has individual records (e.g., rows) for each purchase order and individual fields (columns) for various types of data. In the example, "PONum" is a purchase order number. "RecvTime" is the date and time the purchase order was received, "City" is the city in which the customer issuing a purchase order is located, and "Quantity" is the number of items ordered. "ShipTime" is the date and time goods for a purchase order were shipped, and "DeliveryTime" is the date and time those goods were delivered. Orders for which goods have not yet been shipped have a <NULL> entry in the ShipTime field. Some of the records in FIG. 5 show purchase orders for which goods have not been shipped (PONum 8680 and 8685-87). As goods for these purchase orders are shipped, the "ShipTime" field is updated. Unlike the table of FIG. 2, table 10 is limited to data for purchase orders that are currently active, i.e., for which goods have not been delivered. Accordingly, the "DeliveryTime" field for each record has a NULL entry. Table 10 also has an additional field for an "IsCompleted" flag. An IsCompleted value of 0 indicates that the corresponding purchase order has not been completed. In some embodiments, IsCompleted is a "system" flag that is not displayed to a user querying the table.

Figure 6:
FIG. 6 is an example, according to at least one embodiment of the invention, of a portion of a database table containing records for completed activities.

When a purchase order is completed, the record for that purchase order is deleted from active instances data table 10, and a new record for that purchase order is created in completed instances data table 12 (FIG. 4). That new record is a duplicate of the record deleted from table 10, but with new data to override the NULL value for DeliveryTime and without the IsCompleted field. FIG. 6 shows a portion of table 12 in more detail. Similar to the tables of FIGS. 2 and 5, table 12 has individual records for each completed purchase order and individual fields for the various types of data previously described (PONum, RecvTime, City, Quantity, ShipTime and DeliveryTime). Because a purchase order is defined in the example to be complete when the ordered goods are delivered, each of the DeliveryTime fields in table 12 has a non-NULL value. Table 12 has an additional field for "RecordID." As described in more detail below, this value is incrementally generated as each record for a completed purchase order is created in table 12. As seen by comparison of the PONum and RecordID fields of FIG. 6, purchase orders are not necessarily completed in the same order in which purchase order numbers are assigned. The RecordID field thus provides a mechanism for indexing records of table 12 in the order in which the records were created. This ensures that insert performance will be independent of the table size, and therefore will not decrease over time.

Because it is limited to data for purchase orders that are currently active, the size of table 10 remains relatively small. Although the size of the table might fluctuate as business volume fluctuates, the size of the table will not increase ad infinitum. completed instances data table 12 will grow in size as more purchase orders change from an Active/Incomplete state to an Inactive/Complete state. However, the growth of completed instances data table 12 is less of a concern than is the growth of a single database table containing records for both active and inactive instances (such as that of FIG. 2). Because records are only inserted into table 12 and are not subsequently updated, there is no need to seek a particular record each time table 12 is accessed. In other words, because a record is not being updated, it is not necessary find a particular record within table 12 before inserting a record.

One example of SQL code to create and update the tables of FIGS. 4-6 is included at Appendices B and C. The first statement in Appendix B ("create table PO_Active_Instance-Data") creates table 10 for active instances data and establishes columns for PONum, RecvTime, City, Quantity, ShipTime, DeliveryTime and IsCompleted. PONum is designated as the primary key. In other words, each row of table 10 is uniquely identified by the purchase order number, or PONum. Similarly, the next statement ("create table PO_Completed_InstanceData") creates table 12 for completed instances data and establishes columns for PONum, RecvTime, City, Quantity, ShipTime, DeliveryTime and RecordID. In table 12, however, RecordID is made the primary key and is given an automatically incrementing value by use of the SQL "identity" property. In other words, as each new record is added to the table named PO_Completed_InstanceData (table 12), the database server automatically increments the previous value for RecordID and inserts the incremented value into the added record.

The next statement ("create procedure PO_PrimaryImport") creates a Stored Procedure named PO_PrimaryImport that is used to either create new records in table 10 or to update existing records in table 10. The PO_PrimaryImport Stored Procedure has 5 arguments that correspond to the columns of a row in table 10. For example, upon receiving purchase order 8680 in FIG. 5, a client computer would issue the following stored procedure call to the database server:

PO_PrimaryImport (8680, 08/25/2003 17:19, Redmond, 270 , , , ).

If purchase order 8681 had previously been entered with data for PONum, RecvTime, City and Quantity, the following call to the stored procedure would update the shipping time (ShipTime) to 08/26/2003 0910:

PO_PrimaryImport (8681 , , , 08/26/2003 0910 , , , ).

In order to update the record for purchase order 8682 to reflect a delivery time (DeliveryTime) of 8/26/2003 at 1200 P.M. and flag the purchase order as completed (IsCompleted=1), the following call would be made:

PO_PrimaryImport (8682 , , , 08/26/2003 1200, 1).

Notably, a human operator entering any of the above information into a client computer would not necessarily type one of the above commands. For example, the user could input the information via a graphical user interface, and one or more levels of intermediate software (executing on the client and/or server) would generate the stored procedure call with the proper syntax. As another example, an order could be received automatically via the Internet, and web server software could generate the necessary SQL commands.

The PO_PrimaryImport stored procedure accepts values from the call to the stored procedure and assigns those values to one or more of the local variables @PONum, @RecvTime, @City, @Quantity, @ShipTime, @DeliveryTime and @IsCompleted. The Stored Procedure then attempts to insert those local variable values into the PO_Active_InstanceData table (table 10) via the "insert" statement. Instead of inserting those local variables as a new record in table 10, however, the trigger of Appendix C ("PO_CompletedTrigger") is then fired.

Referring to Appendix C, after declaring the local @PONum and @IsCompleted variables, the trigger assigns values to those variables from the "inserted" system table. The inserted table is automatically generated by the database server, and temporarily stores (in RAM or other system memory) copies of the rows affected during the preceding insert statement of the PO_PrimaryImport stored procedure. In this case, the inserted table contains copies of the arguments passed in the PO_PrimaryImport stored procedure. In other words, the inserted table contains the values that a user is currently attempting to insert or update into table 10.

The trigger first tests to see if the passed value of the IsCompleted bit is equal to 1, which would indicate that the record for the passed PONum value is completed. If the IsCompleted bit equals 1, the trigger then inserts the values for the completed purchase order record into a new record of the PO_Completed_InstanceData table 12). The PONum value for the new table 12 record is obtained from the inserted table ("select inserted.PONum"). The "coalesce" function is used to obtain values of the new table 12 record for RecvTime, City, Quantity, ShipTime and DeliveryTime. In particular, the coalesce function returns the first non-NULL expression from among its arguments. For example, "coalesce (inserted.RecvTime, po.RecvTime)" provides the value for RecvTime in the new table 12 record. The trigger first checks to see if the value of RecvTime in the inserted table is non-NULL. If so, that value is used for the RecvTime value in the new table 12 record. If the value of RecvTime in the inserted table is NULL, the trigger then obtains the value of RecvTime from the record in table 10 which the user was attempting to insert or update with a call to the PO_PrimaryImport stored procedure. One of the arguments of the coalesce function is assured to be non-NULL by the code portion "from inserted left join PO_Active_InstanceData po on inserted.PONum=po.PONum". Specifically, this portion of the trigger code specifies that the values for the arguments in each call of the coalesce function will be obtained from a set consisting of all of the rows of the "inserted" table plus all of the rows of the PO_Active_InstanceData table (table 10) in which the value of PONum is the same as the value for PONum in the inserted table. If, for example, the PO_PrimaryImport stored procedure was called to pass non-NULL values for all of its arguments (i.e., if goods for the purchase order had been delivered by the time any data for the purchase order was first entered into the system), the value of RecvTime for the new table 12 record would come from the inserted table. If, however, the PO_PrimaryImport stored procedure was called to update an existing record in table 10 for which there already exists a value for RecvTime (i.e., a value for RecvTime was not passed in the PO_PrimaryImport stored procedure call), the value of RecvTime in the new table 12 record would come from the existing record in table 10.

After obtaining values for RecvTime, the trigger similarly obtains values of the new table 12 record for the City, Quantity, ShipTime and DeliveryTime fields. As previously discussed, the server automatically supplies a value for the RecordID field. The trigger then deletes the record in table 10 for the completed purchase order ("delete from PO_Active_InstanceData where PONum=@PONum"). At this point, the trigger concludes ("return").

If an IsCompleted value of 0 was passed in the PO_PrimaryImport stored procedure call that fired the trigger, the trigger does not create a new record in table 12. Instead, the trigger attempts to update the table 10 record identified in the call to the PO_PrimaryImport stored procedure ("update PO_Active_InstanceData"). As in the portion of the trigger that creates a new record in table 12, the coalesce function is used to provide a value for the updated table 10 record from either the inserted table or from the existing record in table 10. In this case, however, the values for the coalesce function arguments are provided by the code "from PO_Active_InstanceData po join inserted on po.PONum=inserted.PONum". Specifically, this portion of the trigger code specifies that the values for the coalesce function arguments will be obtained from a set consisting of all of the rows of the PO_Active_InstanceData table (table 10) and of the "inserted" table having the same value for PONum.

If the PO_PrimaryImport stored procedure (Appendix B) was called to add a new, non-completed record to table 10 (i.e., inserting a record for a new purchase order for which goods have not yet been delivered), no values are updated in the "update PO_Active_InstanceData" portion of the trigger code. In such a case, there would be no existing record in table 10 where the value of PONum is the same as the value for PONum in the inserted table, and thus there would be no record in table 10 to update. If no record is updated in table 10 or inserted in table 12, the trigger detects this with the @@rowcount system function. Specifically, the @@rowcount function returns a value of 0 if is no rows were affected in the preceding update statement. If the @@rowcount function returns a 0, the "insert PO_Active_InstanceData select * from inserted" portion of the trigger code inserts a new record in table 10 with values from the "inserted" table.

In another embodiment of the invention, the amount of data in the completed instances data table is limited. As indicated above, the growth of this table (table 12 in FIG. 4) is less of a concern than is the growth of a table such as table 2. However, table 4 will nonetheless continue to grow over time. Even if no records in the table are ever updated (i.e., records are only inserted), the table will eventually become so large that system disk capacity will be exceeded or queries against the data in the table will require an unacceptably long time to complete. As previously indicated, the managers of Business A have determined that completed purchase order data is only needed for purchase orders that have been relatively recently completed. However, deletion of records from table 12 can be time-consuming. In many software environments, such deletion must be performed on a row-by-row basis; a row-lock must be acquired on each record, and the row marked as deleted. In effect, deleting a row can require as much time as inserting or updating a row.

Figure 7:
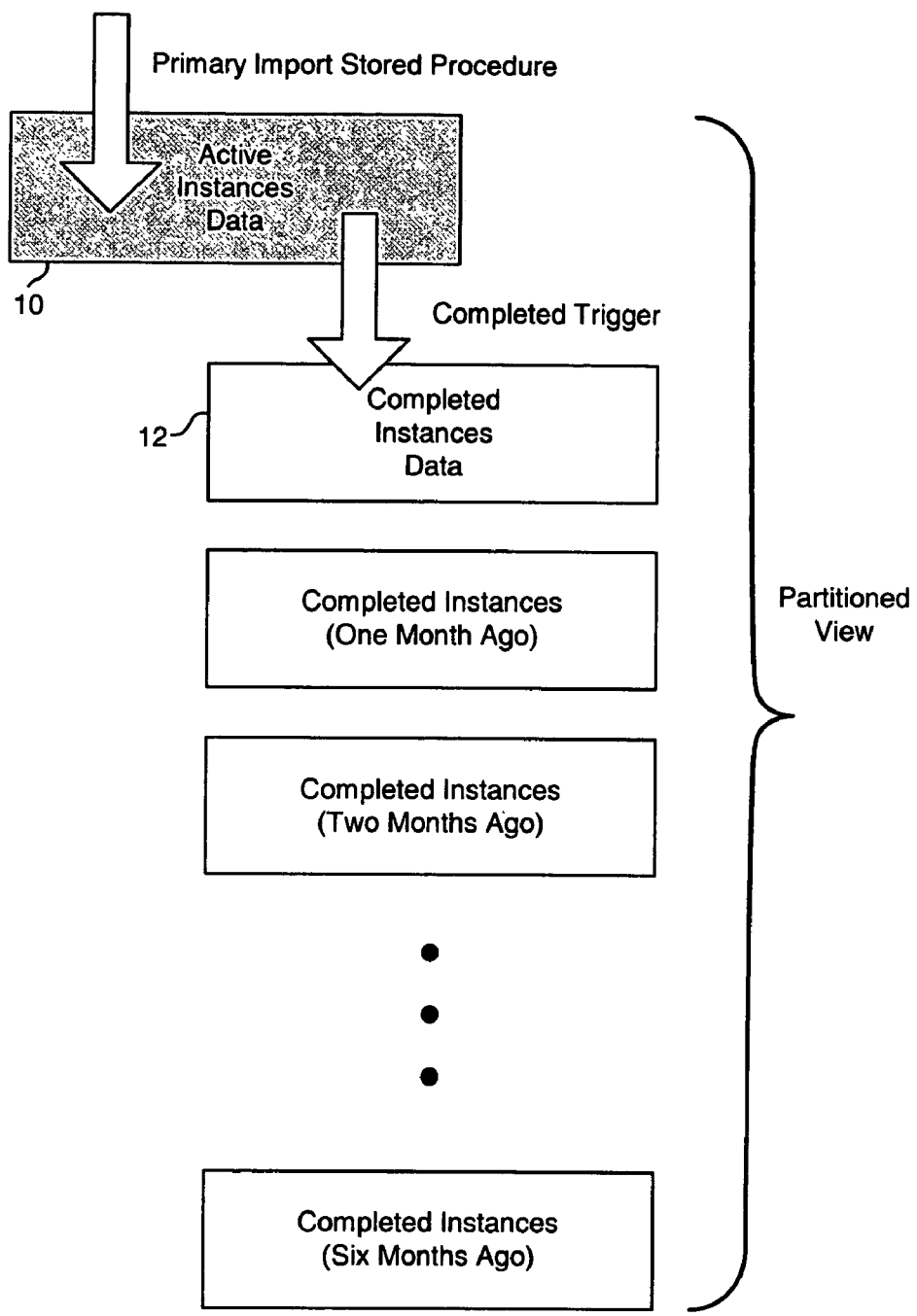
FIG. 7 is a block diagram showing separate tables for active and completed instances data according to another embodiment of the invention.

Accordingly, and as shown in FIG. 7, multiple tables are created for Completed Instance Data. In this embodiment, the code of Appendices B and C operates as previously described to delete completed purchase order records from table 10 and create corresponding new records in table 12. However, table 12 is not allowed to grow without limit. At periodic intervals (e.g., every month), table 12 is renamed with a unique partition name, and no further records are added to that renamed table. A new (and empty) table 12 having the old name of the renamed table ("PO_Completed_InstanceData") is then created. From this point on, the trigger inserts records into the new table. After another month (or other preselected time period), this table is also renamed, and another table 12 created. After a renamed table has been retained for a selected time period (e.g., six months), the entire table is deleted. Unlike deleting individual records, entire tables can be deleted quickly. In one embodiment, tables are removed using a SQL "drop table" command. When a completed instance data table is deleted, the data in that table is not necessarily lost. For example, the deleted table can be archived by transferring the data in the table to tape or other type of storage medium prior to calling the drop table function. In other embodiments, instead of creating a new table 12 at periodic intervals, a new table 12 is created when the size of table 12 reaches a certain level.

So that all data in the active instance and completed instance tables can be conveniently viewed and queried (i.e., so that a separate query is not necessary on each individual table), the active and completed instances tables (or some desired sub-grouping of those tables) can be combined into a partitioned view. In at least one embodiment, the tables can be combined with a "union all select * . . . " SQL statement. This view combining the tables could be recreated each time one of the completed instance data tables is dropped (or alternatively, each time a new completed instance data table is created).

In another aspect of the invention, data from the active and completed instances tables are further processed to provide additional analysis data. By way of illustration, Business A may wish to collectively analyze currently active purchase order data and data for recently completed purchase orders. Business A may, for example, wish to generate one or more OLAP cubes for the combined data. Again, and notwithstanding the hypothetical nature of the Business A used for purposes of explaining the invention, actual organizations also have a need to generate OLAP cubes reflecting both active and completed instances of an organization's activity.

Figure 8:
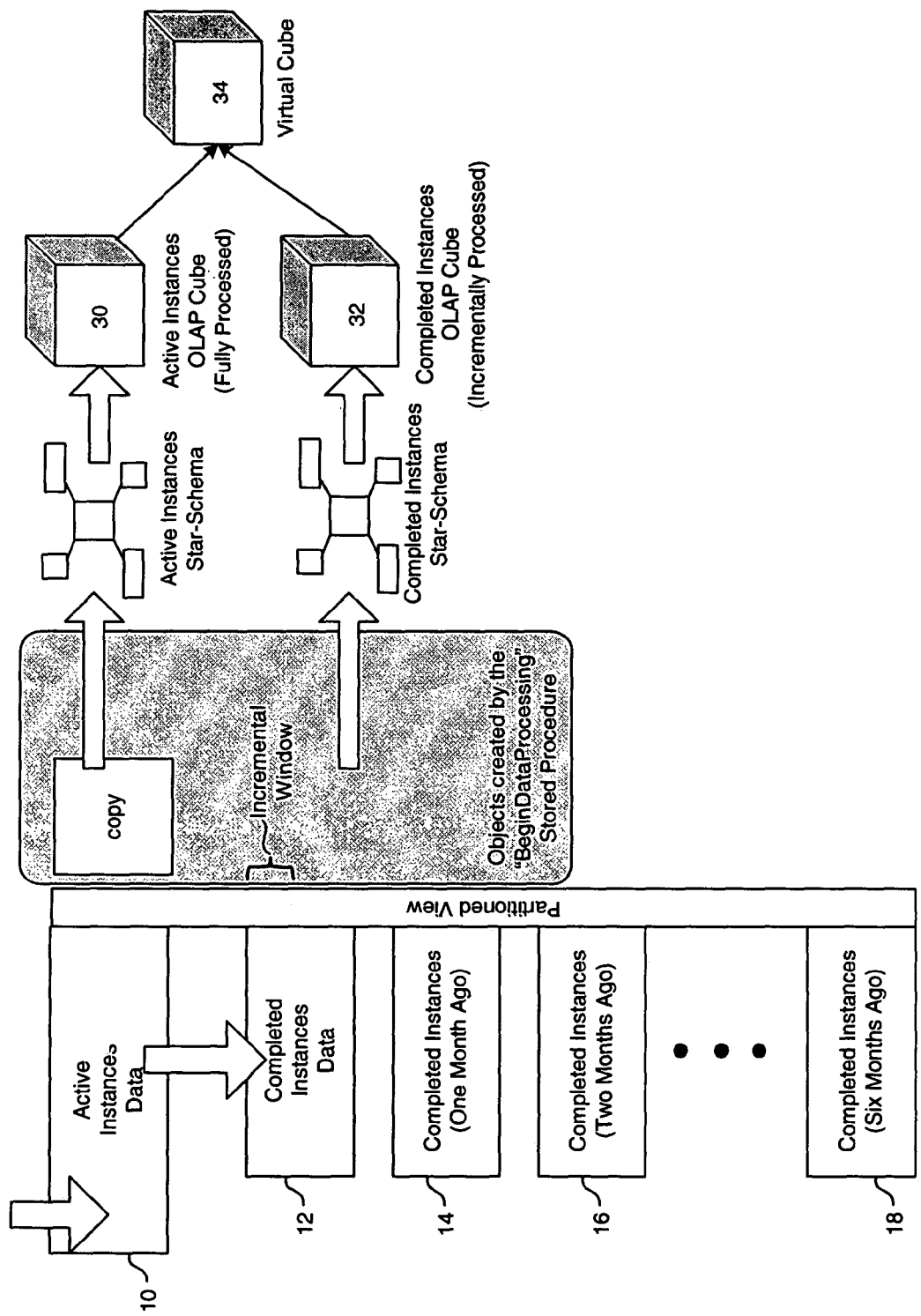
FIG. 8 is a chart showing flow of data processing for combined OLAP analysis of active and completed instances data according to at least one embodiment of the invention.

FIG. 8 shows, in at least one embodiment, a flow of data processing for combined OLAP analysis of active and completed instance data. A stored procedure ("BeginDataProcessing") is executed at periodic intervals, e.g. nightly. This procedure first creates a copy of the active instances data table (table 10). Because this table is kept relatively small, this copy can be created relatively quickly. The data in the copy is then passed to a Data Transformation Service (DTS)(not shown) to be placed into a star-schema and then fully processed into an OLAP cube 30 for the active instance data. The BeginDataProcessing stored procedure also obtains a portion of the completed instances data that lies in an incremental window. In particular, each time the BeginDataProcessing procedure obtains completed instances data, the database server stores the RecordID value of the last record obtained. As previously discussed, this value was incrementally assigned by the server when the record was created. By referencing the stored RecordID value for the last completed instances data record obtained during the prior execution of the BeginDataProcessing procedure, only records that have been created since that prior execution are obtained in the current operation. The incremental window is implemented as a special view created on top of the partitioned view containing multiple tables/partitions for active and completed instances data. In this manner, the incremental window can contain data from more than one partition. If, for example, the BeginDataProcessing procedure is executed weekly, a new completed instances data table may have been created since the last execution of the BeginDataProcessing stored procedure, and data from multiple Completed Instance Data tables would need to be processed. In at least one embodiment, the BeginDataProcessing stored procedure obtains a copy of the active instances data table and records from the completed instances data table at the same time. Otherwise, purchase orders could be moved from the active instances data table after copying by the BeginDataProcessing procedure, but prior to obtaining records from the completed instances data table. Were this to occur, the same purchase orders would be processed twice and undermine the accuracy of the data analysis.

The BeginDataProcessing procedure passes the incremental completed instances data records created since the prior BeginDataProcessing execution to the DTS. The DTS then places that incremental data into a star-schema that already contains data from prior processing of completed instances data. The star-schema for completed instances data (which now contains the incremental data from recent completed instances data records) is then used to update completed instances OLAP cube 32. Similar to the completed instances star-schema, OLAP cube 32 contains information about records that were processed in previous sessions. OLAP cubes 30 and 32 are then combined into a single virtual OLAP cube 34. The number of completed records for which OLAP cube 32 contains information may become very large over time. However, by incrementally processing completed instances data and combining the results of that processing with previously-processed completed instances data, OLAP cube 32 (and hence, virtual OLAP cube 34) can be generated in a relatively small amount of time. In other words, reprocessing of completed instances data can be avoided.

Virtual OLAP cube 34 provides a user with a "snapshot" of the business containing information about both historical and in-progress (i.e., active) purchase orders. Data Transformation Services (DTS) packages that process cubes 30-34 can be scheduled to run at night or during other off-peak hours.

Although the invention has been described using a hypothetical business type as an example, it should be remembered that the invention is not limited to a particular type of business, organization or activity. Indeed, the invention is not limited to implementations in which completed instance data is retained on the basis of age of the completed instance data. Instead of maintaining data for purchase orders completed in the last few months, another organization may use some other criteria for retaining inactive instance data for quick access. As merely one example, a surveying company may wish to quickly access data for several land parcels, but may only infrequently access data about other parcels. Accordingly, although specific examples of carrying out the invention have been described, those skilled in the art will appreciate that there are numerous variations and permutations of the above described systems and techniques that fall within the spirit and scope of the invention as set forth in the appended claims. These and other modifications are within the scope of the invention as defined by the attached claims.

APPENDIX A

```
create table PO_InstanceData
(
    PONum int primary key,
    RecvTime datetime null,
    City nvarchar(50) null,
    Quantity int null,
    ShipTime datetime null,
    DeliveryTime datetime null
)
go
create procedure PO_PrimaryImport
(
    @PONum int,
    @RecvTime datetime=null,
    @City nvarchar(50)=null,
    @Quantity int=null,
    @ShipTime datetime=null,
    @DeliveryTime datetime=null
)
as
begin
update PO_InstanceData
set
    RecvTime=coalesce(@RecvTime,RecvTime),
    City=coalesce(@City,City),
    Quantity=coalesce(@Quantity,Quantity),
    ShipTime=coalesce(@ShipTime,ShipTime),
    DeliveryTime=coalesce(@DeliveryTime,DeliveryTime)
where PONum=@PONum
if @@rowcount=0
insert PO_InstanceData values
    (@PONum,@RecvTime,@City,@Quantity,@ShipTime,
    @DeliveryTime)
end
```

APPENDIX B

```
create table PO_Active_InstanceData
(
    PONum int primary key,
    RecvTime datetime null,
    City nvarchar(50) null,
    Quantity int null,
    ShipTime datetime null,
    DeliveryTime datetime null,
    IsCompleted bit
)
create table PO_Completed_InstanceData
(
    RecordID int primary key identity,
    PONum int,
    RecvTime datetime null,
    City nvarchar(50) null,
    Quantity int null,
    ShipTime datetime null,
    DeliveryTime datetime null
)
go
create procedure PO_PrimaryImport
(
    @PONum int,
    @RecvTime datetime=null,
    @City nvarchar(50)=null,
    @Quantity int=null,
    @ShipTime datetime=null,
    @DeliveryTime datetime=null,
    @IsCompleted bit=0
)
as
insert PO_Active_InstanceData values (
    @PONum,
    @RecvTime,
    @City,
    @Quantity,
    @ShipTime,
    @DeliveryTime,
    @IsCompleted)
go
```

APPENDIX C

```
create trigger PO_CompletedTrigger on PO_Active_InstanceData
instead of insert
as
begin
    declare @PONum int
    declare @IsCompleted bit
    select @PONum=PONum,@IsCompleted=IsCompleted from inserted
    if (@IsCompleted=1)
    begin
        insert PO_Completed_InstanceData
(PONum,RecvTime,City,Quantity,ShipTime,DeliveryTime)
        select
            inserted.PONum,
            coalesce(inserted.RecvTime,po.RecvTime),
            coalesce(inserted.City,po.City),
            coalesce(inserted.Quantity,po.Quantity),
            coalesce(inserted.ShipTime,po.ShipTime),
            coalesce(inserted.DeliveryTime,po.DeliveryTime)
        from inserted left join PO_Active_InstanceData po on
inserted.PONum=po.PONum
        delete from PO_Active_InstanceData where
PONum=@PONum
        return
    end
    update PO_Active_InstanceData
    set
        RecvTime=coalesce(inserted.RecvTime,po.RecvTime),
        City=coalesce(inserted.City,po.City),
        Quantity=coalesce(inserted.Quantity,po.Quantity),
        ShipTime=coalesce(inserted.ShipTime,po.ShipTime),
        DeliveryTime=coalesce(inserted.DeliveryTime,po.DeliveryTime)
    from PO_Active_InstanceData po join inserted on
```

APPENDIX C-continued

```
po.PONum=inserted.PONum
    if @@rowcount=0
    insert PO_Active_InstanceData select * from inserted
end
go
```

The invention claimed is:

1. A method, implemented at a computer system that includes one or more processors, for maintaining information regarding multiple instances of an activity, each instance having an active condition in which information about the instance is to be modified or an inactive condition in which information about the instance is not to be modified, the method comprising:
the computer system creating a record in a first database table for each of the multiple instances in the active condition, each record containing a field for each of a plurality of data types, one or more of the fields in each active instance record having a value indicative of the active condition;
the computer system assigning, for records of the multiple instances in the inactive condition, values to the one or more fields indicative of the inactive condition;
the computer system deleting from the first table records of instances having values in the one or more fields indicative of the inactive condition thereby reducing a size of the first database table to prevent degradation of response times when database users access the records for the instances in the active condition; and
the computer system creating, for records deleted from the first table, a corresponding record in a second database table.

2. The method of claim 1, wherein no record of the second table is updated after being created.

3. The method of claim 1, wherein the inactive condition corresponds to an instance of the activity being complete.

4. The method of claim 1, wherein data in a first table record at the time of deletion is copied to the corresponding second table record.

5. The method of claim 1, wherein substantially all of the data in a first table record at the time of deletion is copied to the corresponding second table record.

6. The method of claim 1, wherein the first table contains only records for instances in the active condition.

7. The method of claim 1, wherein the one or more of the fields comprises a flag having a first value if an instance is active and a second value if an instance is inactive.

8. The method of claim 1, wherein the one or more of the fields comprises a field containing, for inactive instance records, a time of completion of the instance.

9. The method of claim 1, further comprising:
creating a view comprising the first and second tables.

10. The method of claim 1, further comprising:
creating a third database table;
ceasing creation of records in the second table; and
creating, for each of the records deleted from the first table after creation of the third table, a corresponding record in the third table.

11. The method of claim 10, wherein said creating a third database table comprises creating the third database table after a preset time period has elapsed.

12. The method of claim 10, further comprising:
deleting the second database table.

13. The method of claim 10, further comprising:
renaming the second database table.

14. The method of claim 10, further comprising:
creating subsequent database tables;
ceasing, upon creation of a subsequent table, creation of records in the previously-created table; and
creating, for each of the records deleted from the first table after creation of the last-created table but before creation of another subsequent table, a corresponding record in the last-created table.

15. The method of claim 14, further comprising:
deleting a subsequently created table for each newly created table upon the number of tables reaching a predetermined level.

16. The method of claim 15, further comprising archiving a copy of a table prior to deletion.

17. The method of claim 14, further comprising:
creating a view comprising the non-deleted tables.

18. The method of claim 14, wherein said creating a subsequent database table comprises renaming the previously-created table.

19. The method of claim 1, further comprising:
generating analysis data based on data in the first and second tables.

20. The method of claim 19, wherein said generating analysis data further comprises:
generating a first Online Analytical Processing (OLAP) cube for records in the first table,
generating a second OLAP cube for records in the second table, and
combining the first and second cubes into a virtual OLAP cube.

21. The method of claim 20, wherein said generating a second OLAP cube comprises obtaining records from the second table, and further comprising:
assigning a unique incremental identifier value to each record in the second table;
storing the incremental identifier value for the last record obtained to generate the second OLAP cube;
subsequently obtaining additional records from the second table, the additional records not being processed to form the second OLAP cube; and
updating the second OLAP cube based on the additional records.

22. The method of claim 21, wherein:
said generating a second OLAP cube comprises inputting data from second table records into a star-schema and storing said star-schema after generation of the second OLAP cube, and
said updating the second OLAP cube comprises modifying the stored star-schema and using data from the additional second table records and regenerating the second OLAP cube based on the modified star-schema.

23. A computer-readable storage medium having stored thereon data representing sequences of instructions which, when executed by a processor, cause the processor to perform steps comprising:
the processor creating a record in a first database table for each of multiple instances of an activity, wherein:
each instance has an active condition in which information about the instance is to be modified or an inactive condition in which information about the instance is not to be modified,
the first table records are created for instances in the active condition, and
each record of the first table contains a field for each of a plurality of data types, one or more of the fields in each active instance record having a value indicative of the active condition;

the processor assigning, for records of the multiple instances in the inactive condition, values to the one or more fields indicative of the inactive condition;

the processor deleting from the first table records of instances having values in the one or more fields indicative of the inactive condition thereby reducing a size of the first database table to prevent degradation of response times when database users access the records for the instances in the active condition; and the processor creating, for records deleted from the first table, a corresponding record in a second database table.

24. The computer-readable storage medium of claim 23, wherein no record of the second table is updated after being created.

25. The computer-readable storage medium of claim 23, wherein the inactive condition corresponds to an instance of the activity being complete.

26. The computer-readable storage medium of claim 23, wherein data in a first table record at the time of deletion is copied to the corresponding second table record.

27. The computer-readable storage medium of claim 23, wherein substantially all of the data in a first table record at the time of deletion is copied to the corresponding second table record.

28. The computer-readable storage medium of claim 23, wherein the first table contains only records for instances in the active condition.

29. The computer-readable storage medium of claim 23, wherein the one or more of the fields comprises a flag having a first value if an instance is active and a second value if an instance is inactive.

30. The computer-readable storage medium of claim 23, wherein the one or more of the fields comprises a field containing, for inactive instance records, a time of completion of the instance.

31. The computer-readable storage medium of claim 23, comprising further instructions for performing steps comprising:
creating a view comprising the first and second tables.

32. The computer-readable storage medium of claim 23, comprising further instructions for performing steps comprising:
creating a third database table;
ceasing creation of records in the second table; and
creating, for each of the records deleted from the first table after creation of the third table, a corresponding record in the third table.

33. The computer-readable storage medium of claim 32, wherein said creating a third database table comprises creating the third database table after a preset time period has elapsed.

34. The computer-readable storage medium of claim 32, comprising further instructions for performing steps comprising:
deleting the second database table.

35. The computer-readable storage medium of claim 32, comprising further instructions for performing steps comprising:
renaming the second database table.

36. The computer-readable storage medium of claim 32, comprising further instructions for performing steps comprising:
creating subsequent database tables;
ceasing, upon creation of a subsequent table, creation of records in the previously-created table; and
creating, for each of the records deleted from the first table after creation of the last-created table but before creation of another subsequent table, a corresponding record in the last-created table.

37. The computer-readable storage medium of claim 36, comprising further instructions for performing steps comprising:
deleting a subsequently created table for each newly created table upon the number of tables reaching a predetermined level.

38. The computer-readable storage medium of claim 37, comprising further instructions for performing steps comprising archiving a copy of a table prior to deletion.

39. The computer-readable storage medium of claim 36, comprising further instructions for performing steps comprising:
creating a view comprising the non-deleted tables.

40. The computer-readable storage medium of claim 36, wherein said creating a subsequent database table comprises renaming the previously-created table.

41. The computer-readable storage medium of claim 23, comprising further instructions for performing steps comprising:
generating analysis data based on data in the first and second tables.

42. The computer-readable storage medium of claim 41, wherein said generating analysis data further comprises:
generating a first Online Analytical Processing (OLAP) cube for records in the first table,
generating a second OLAP cube for records in the second table, and
combining the first and second cubes into a virtual OLAP cube.

43. The computer-readable storage medium of claim 42, wherein said generating a second OLAP cube comprises obtaining records from the second table, and comprising further instructions for performing steps comprising:
assigning a unique incremental identifier value to each record in the second table;
storing the incremental identifier value for the last record obtained to generate the second OLAP cube;
subsequently obtaining additional records from the second table, the additional records not being processed to form the second OLAP cube; and
updating the second OLAP cube based on the additional records.

44. The computer-readable storage medium of claim 43, wherein:
said generating a second OLAP cube comprises inputting data from second table records into a star-schema and storing said star-schema after generation of the second OLAP cube, and
said updating the second OLAP cube comprises modifying the stored star-schema and using data from the additional second table records and regenerating the second OLAP cube based on the modified star-schema.

45. A data processing apparatus for maintaining information regarding multiple instances of an activity, each instance having an active condition in which information about the instance is to be modified or an inactive condition in which information about the instance is not to be modified, comprising:
at least one data storage device;
at least one user input device; and
a processor operatively connected to said storage device and said user input device, wherein the at least one data storage device has stored thereon a set of instructions which, when executed by the processor, implement a method that includes:

the data processing apparatus creating a record in a first database table for each of the multiple instances in the active condition, each record containing a field for each of a plurality of data types, one or more of the fields in each active instance record having a value indicative of the active condition, the data processing apparatus assigning, for records of the multiple instances in the inactive condition, values to the one or more fields indicative of the inactive condition, the data processing apparatus deleting from the first table records of instances having values in the one or more fields indicative of the inactive condition thereby reducing a size of the first database table to prevent degradation of response times when database users access the records for the instances in the active condition, and the data processing apparatus creating, for records deleted from the first table, a corresponding record in a second database table.

46. The data processing apparatus of claim 45, wherein the set of instructions includes additional instructions which, when executed, configure said processor to:

generate a first Online Analytical Processing (OLAP) cube for records in the first table, generate a second OLAP cube for records in the second table, and combining the first and second cubes into a virtual OLAP cube.

* * * * *